United States Patent [19]

Nagata et al.

[11] 4,380,832
[45] Apr. 19, 1983

[54] PORTABLE RADIO COMMUNICATION DEVICE HAVING SIGNAL PROCESSING CIRCUIT WITH PRESETTING FUNCTION

[75] Inventors: Koichi Nagata; Shinjiro Umetsu, both of Tokyo, Japan

[73] Assignee: Nippon Electric Co., Ltd., Tokyo, Japan

[21] Appl. No.: 288,448

[22] Filed: Jul. 30, 1981

[30] Foreign Application Priority Data

Jul. 31, 1980 [JP] Japan ............................ 55-108571[U]

[51] Int. Cl.$^3$ ............................................. H04B 1/16
[52] U.S. Cl. ..................................... 455/343; 329/189
[58] Field of Search ................ 455/343, 127; 358/190; 329/189; 307/140

[56] References Cited

U.S. PATENT DOCUMENTS 4,127,846  11/1978  Mori et al. ..................... 340/825.75

Primary Examiner—Marc E. Bookbinder
Attorney, Agent, or Firm—Sughrue, Mion, Zinn, Macpeak and Seas

[57] ABSTRACT

A portable radio communication device has a presetting circuit which includes a capacitor having a certain discharge time. The device is provided with a power supply switch having three terminals. On the connection of the first two terminals of the switch, power is supplied to the device. On the connection of the second and third terminal, power supply is stopped and a discharge path is provided for the capacitor. Thus when the device is turned ON and then momentarily turned OFF, and ON again, the capacitor discharge time is reduced.

7 Claims, 3 Drawing Figures

PORTABLE RADIO COMMUNICATION DEVICE HAVING SIGNAL PROCESSING CIRCUIT WITH PRESETTING FUNCTION

BACKGROUND OF THE INVENTION

The present invention relates to portable radio communication devices, and more particularly to portable radio communication devices having signal processing circuits capable of being preset by the turning ON or OFF of the power supply.

Portable radio communication devices, such as radio paging receivers, usually use a single-cell battery (1.5 Volts, for example) as their power source to make them more compact and lighter. Also, such devices include a processing circuit for demodulating and detecting a calling signal. The processing circuit, which comprises C-MOS (Complementary-Metal Oxide Silicon) integrated circuits of less power consumption or a microprocessor having programmed procedures, requires a highly efficient DC-DC converter for boosting the voltage of the battery and supplying the boosted voltage to the processing circuit so that the detected calling signal can be processed at a high speed. A presetting circuit is further needed for setting the processing circuit in its initial state when a power source switch is turned ON.

Such a presetting circuit, composed of a differentiating circuit (comprising a resistor and a capacitor, for example) and other elements, usually has the disadvantage that, when the power source switch is turned ON, then OFF, and ON again within a short period of time, the output voltage of the differentiating circuit fails to reach the critical level at which the processing circuit can accept the presetting signal in response to the second turning-ON, because the capacitor cannot be sufficiently discharged during the short "OFF" period. Therefore, the processing circuit cannot be set in its initial state. Such quick repetition of turning ON and OFF the power switch often takes place when a person wants to make sure a paging receiver is ON (i.e., operative) before taking it out with him. As a result, the receiver often fails to perform normal receiving operation.

SUMMARY OF THE INVENTION

An object of the present invention, therefore, is to provide a portable radio communication device capable of operating reliably regardless of any turning ON/-OFF of its power source switch.

According to the invention, there is provided a portable radio communication device comprising: battery means; voltage converter means connected to said battery means for converting the voltage of said battery means to another voltage; processing circuit means having a presetting terminal and a power supply terminal to which said another voltage is supplied, for detecting and processing received signals; presetting circuit means connected between the output of said voltage converter means and said presetting terminal for setting said processing circuit means in its initial state in response to said another voltage; and power supply switch means having first terminal connected to said battery means, second terminal connected to a potential point, and third terminal connected to the input of said presetting circuit either directly or by way of a low impedance means, thereby supplying the voltage of said battery means to said communication device in response to the connection of said first and second terminals, and stopping the voltage supply from said battery means to said communication device and reducing the discharge time of said presetting circuit in response to the connection of said second and third terminals.

BRIEF DESCRIPTION OF THE DRAWINGS

Other features and advantages of the present invention will be more apparent from the following detailed description taken in conjunction with the accompanying drawings, wherein.

DETAILED DESCRIPTION OF THE INVENTION

Figure 1:
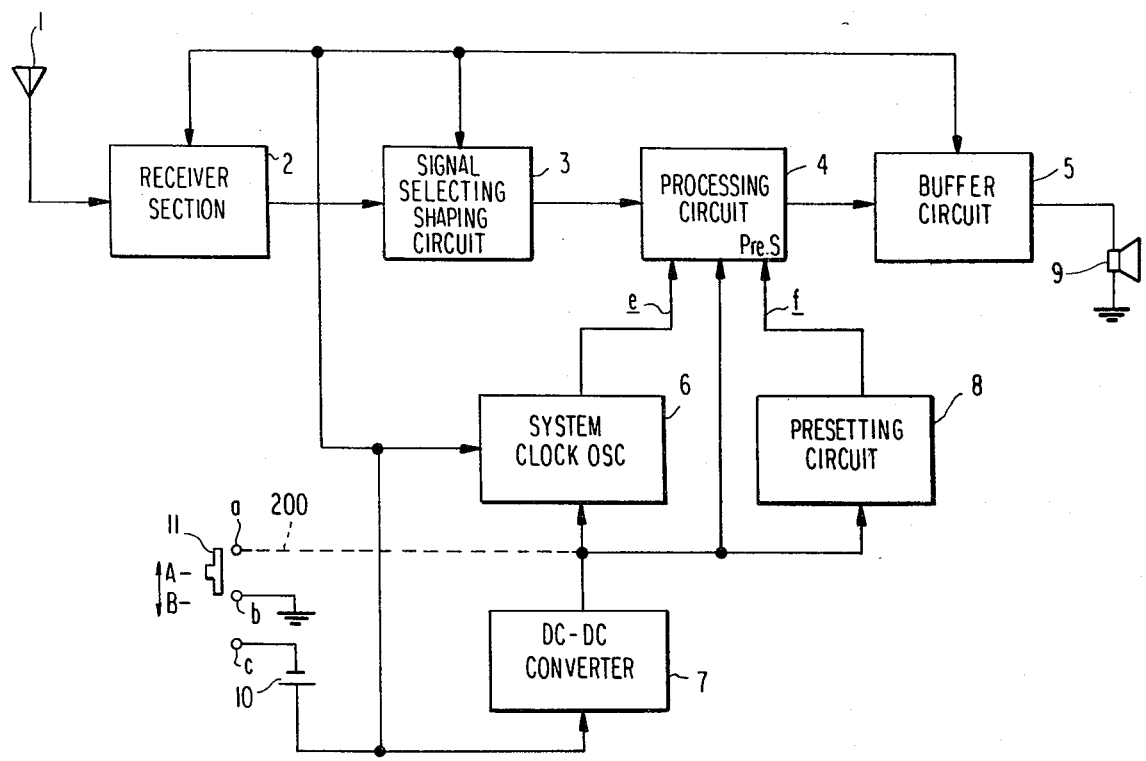
FIG. 1 is a block diagram illustrating one example of a portable radio communication device, in particular a paging receiver, to which the invention is applicable.

In FIG. 1, a radio-frequency carrier wave modulated with a predetermined calling signal (composed of a digital signal or a tone signal) is picked up by an antenna 1 and supplied to a receiver section 2 of, for example, a double super-heterodyne type, which includes a discriminator. The signal demodulated by the receiver section 2 is supplied to a signal selecting-shaping circuit 3, which selects and waveform-shapes the demodulated calling signal and supplies it to a processing circuit 4. The processing circuit 4 processes and detects the calling signal, and supplies an alert signal to a buffer circuit (for example, an amplifier) 5. The buffer circuit 5 amplifies the alert signal and drives a speaker 9 to sound an alert tone. As a power source, a battery 10 is used, for instance, a 1.5-V (Volts) R6 type dry battery, whose positive terminal is connected to the receiver section 2, the signal selecting-shaping circuit 3, the buffer circuit 5, a system clock oscillator circuit 6 and a DC-DC converter 7. The output of the DC-DC converter 7 is connected to the clock oscillator circuit 6, the processing circuit 4 and a presetting circuit 8. The presetting circuit 8 presets the processing circuit 4 by way of the DC-DC converter 7 in response to the turning ON of a power source switch 11.

Figure 2:
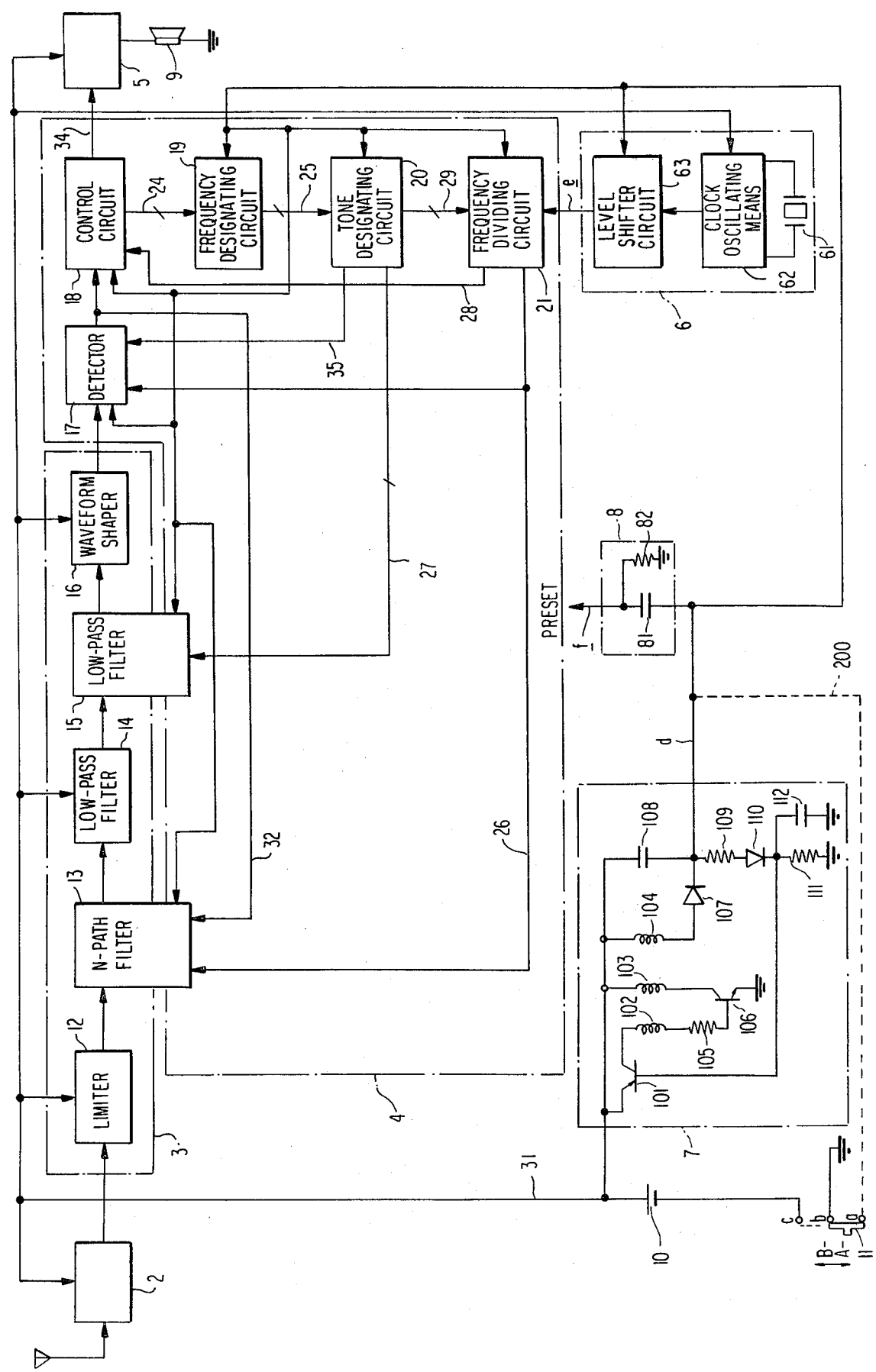
FIG. 2 is a block diagram showing more specific details of FIG. 1.

In FIG. 2 is shown more specific details of FIG. 1. Most of the circuits illustrated therein are disclosed in the U.S. Pat. No. 4,127,846 assigned to the same assignee as the present invention. Thus, circuits 12 to 21, 24 to 29 and 32 have respectively the same functions as the corresponding circuits disclosed in said U.S. patent. Further, signals 25 to 29, 32 and 35 are respectively the same as the corresponding signals therein. Also, antenna 1 and circuits 2, 9 and oscillating element 61 shown in FIG. 2 herein respectively correspond to the antenna 10 and circuits 11, 30 and oscillating element 22 in said U.S. patent and shown in FIG. 1 thereof.

As is obvious from FIG. 2, the signal selecting-shaping circuit 3 comprises a limiter 12, an N-path filter 13, low-pass filters 14 and 15, and a waveform shaper 16. The processing circuit 4 comprises a detector 17, a control circuit 18, a frequency designating circuit 19, a tone designating circuit 20 and a frequency dividing circuit 21, and further includes the logic circuit of the N-path filter 13 and the switch of the low-pass filter 15. All the components of this processing circuit 4, except the frequency designating circuit 19 (for example, Programable Read Only Memory-PROM), can be made of complementary metal oxide silicon (C-MOS), and they further permit large-scale integration. The clock oscillator circuit 6 is composed of a crystal oscillating element 61, clock oscillating means 62 and a level shifter circuit 63 for shifting the output level of this means 62. The positive electrode of the battery 10 is coupled to the clock oscillating means 62, and the output voltage of the converter 7 is supplied to the level shifter circuit 63.

The processing circuit 4 made of C-MOS usually requires the power source voltage of at least 1.8 V to operate at a high speed of about 1 MHz. Accordingly, the DC-DC converter 7 boosts the voltage (for example, 1.5 V (Volts)) of the battery 10 up to at least 1.8 V (Volts) and supplies the boosted voltage to the processing circuit 4. Also, the clock oscillator circuit 6 supplies a system clock e of about 1 MHz to the processing circuit 4.

For further details on the operations of the circuits illustrated in FIG. 2 except the DC-DC converter 7 and a presetting circuit 8, reference is made to the patent referred to above. Also, the circuits described above do not differ from those of any conventional paging receiver.

The structural feature of the present invention lies in the arrangement of a sliding type power supply switch 11 having three terminals a, b and c, in which the first terminal a is connected to the output of the DC-DC converter 7, as shown by broken lines 200 in FIGS. 1 and 2. The second terminal b is connected to the earth potential; and the third terminal c, to the negative pole of the power source battery 10.

The DC-DC converter 7 includes a transformer whose coils 102, 103 and 104 are wound around the same toroidal core. The converter 7 comprises an oscillating section, a boosting section and a feedback circuit section and provides an output of, say 2.0 Volts, for example. The oscillating section comprises a transistor 106, a resistor 105 connected to the base of the transistor 106, the coil 102 connected to the resistor 105 and the coil 103 connected to the collector of the transistor 106. The boosting section comprises the coil 104 for taking out the output voltage from the oscillating section, a diode 107 for rectification and a capacitor 108. The feedback circuit section, which stabilizes an output voltage emerging on a conductor d, comprises resistors 109 and 111, a diode 110, a capacitor 112 and a transistor 101 for control use. Since this kind of DC-DC converter is required to be highly efficient, the DC impedance of a bleeder circuit (consisting of the resistors 109 and 111, and the diode 110) must be kept high. For example, the sum of the resistances of the resistors 109 and 111 is selected to be about 100 KΩ.

On the other hand, a load on this kind of DC-DC converter is also desired to be of high DC impedance. Actually, since the processing circuit 4 is made of, for example, C-MOS, the load has a high impedance.

The processing circuit 4 consists of a random logic integrated circuit having a predetermined processing procedure, and, therefore, is required to be set in its initial state by a presetting signal outputted on a conductor f which has passed through the converter 7 and through the presetting circuit 8. The presetting signal is generated when the power supply switch 11 is slid up to position B, i.e., it is turned ON. The presetting circuit 8 is a simple differential circuit consisting of a capacitor 81 and a resistor 82, and the waveform of its presetting signal on the conductor f is shown in FIG. 3(a). The presetting signal should desirably be given to the processing circuit 4 for a time duration after the power supply switch 11 is turned ON, because, after the activation of the power supply, the circuits in the receiver are in an unstable state during the transitional period of time and the processing circuit 4 is required to be forceably held in its initial state even after the lapse of this transitional period. On the other hand, the paging receiver requires the paging of a calling signal soon after the power supply switch 11 is turned ON. The optimal time duration in practical use, therefore, ranges from 30 ms to 50 ms. On the other hand, the build-up time of the DC-DC converter 7 is about 3 ms, negligible in comparison to the optimal preset time duration of 30 to 50 ms.

Figure 3:
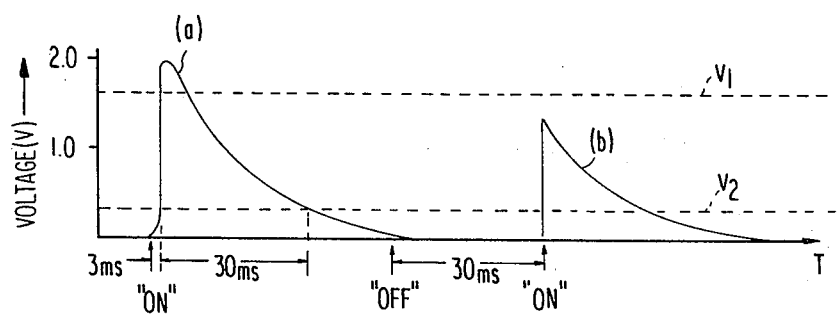
FIG. 3 is a waveform diagram for describing the presetting circuit referred to in FIGS. 1 and 2.

Here, to select a time constant $\tau$ of the presetting circuit 8 for a preset time duration of 30 ms, the resistance of the resistor 82 can properly be set at about 1/10 of the minimum input impedance, which is several megohms, of the processing circuit (consisting of C-MOS) 4, or 500 KΩ. On the other hand, the time duration from the peak level of the presetting signal to a critical preset "OFF" level (for example, 0.3 V (Volts)) $V_2$, as shown in FIG. 3, is selected to be about 1.5 times the time constant $\tau$. Accordingly the capacitance C of the capacitor 81 is given as follows:

$$C = 30/(1.5 \times 500)[\mu F] = 0.04[\mu F]$$

In a conventional device which does not include the conductor 200, the discharge time constant $\tau_d$ of the presetting circuit 8 is given by the following equation:

$$\tau_d = C \times (\text{resistance of resistor } 82 + \text{resistance of resistor } 109 + \text{resistance of resistor } 111)$$

Since the resistance of the resistor 82 is about equal to the sum of the resistances of the resistors 109 and 111, the discharge time constant of the differential circuit is about twice its charge time constant, or 40 ms. Whereas the intervals of turning ON and OFF the power supply switch 11 are usually around 100 ms each, they can be reduced to about 30 ms each in quick actions, and the amplitude of the presetting signal does not reach, as illustrated in FIG. 3(b), the critical preset "ON" level (for example, 1.7 V (Volts) $V_1$ required by the processing circuit 4.

To obviate the disadvantage described above, the input to the capacitor 81, i.e., the output conductor d of the DC-DC converter 7, is directly connected to the terminal a of the power supply switch 11 in this embodiment of the present invention so that the discharge time constant is forced to be identical with the charge time constant when the power supply switch 11 is slid from the position B up to position A, i.e., it is OFF. Obviously, the input of the capacitor 81 can as well be connected to the terminal a by way of a resistor element having a sufficiently lower resistance than that of the resistor 82.

The power supply switch 11 is OFF in its position A and ON in its position B. This structure of the power supply switch 11 can be readily achieved with a compact slide switch, rotary switch or push switch. Since the discharge time constant is set at 20 ms in this manner, it is shorter than the length of time, 30 ms, taken by each operation of the power supply switch, and, therefore, the presetting circuit 8 always provides the presetting signal, such as that shown in FIG. 3(a), regardless of any turning-ON/OFF of the switch 11. Although a random logic integrated circuit is described above as the processing circuit 4, the same effect can obviously be achieved in a microprocessor which is used as the circuit for processing binary digital codes of a high-speed bit rate.

As is evident from the foregoing description, the present invention makes it possible, by reducing the discharge time constant of the presetting circuit by the use of a power supply switch circuit, to set the communication device securely in its initial state regardless of any turning-ON/OFF operation of the power supply switch, and thereby to improve its reliability with hardly any structural or economic burden.

What is claimed:

1. A portable radio communication device comprising:
   (a) battery means;
   (b) voltage converter means connected to said battery means for converting the voltage of said battery means to another voltage;
   (c) processing circuit means, having a presetting terminal and a power supply terminal to which said other voltage is supplied, for detecting and processing received signals;
   (d) presetting circuit means provided between the output of said volage converter means and said presetting terminal for setting said processing circuit means in an initial state in response to said other voltage; said presetting circuit having at least one element which is chargeable and dischargeable; and
   (e) power supply switch means having a first terminal connected to said battery means, a second terminal connected to a reference potential point, a third terminal connected to the input of said presetting circuit either directly or by way of a low impedance means and a connecting means for selectively connecting pairs of said terminals; the voltage of said battery means being supplied in response to a connection of said first and second terminals, and the voltage supply from said battery means being stopped and a discharge time of said element in said presetting circuit being set at a sufficiently low value so that said processing means is securely maintained in said initial state when battery voltage is supplied initially or after prior battery voltage stoppage in response to a connection of said second and third terminals.

2. A portable radio communication device as claimed in claim 1, wherein said at least one element in said presetting circuit means comprises a capacitor connected between the output of said voltage converter means and said presetting terminal, said presetting circuit means further comprising a resistor connected between said presetting terminal and said potential point.

3. A portable radio communication device as claimed in claims 1 or 2, wherein said voltage converter means is a DC-DC converter.

4. A portable radio communication device as claimed in claims 1 or 2, wherein said processing circuit means comprises C-MOS circuits.

5. The device of claim 1 wherein said power supply switch is a rotary switch.

6. The device of claim 1 wherein said power supply switch is a sliding switch.

7. The device of claim 1 wherein said power supply switch is a push-switch.

* * * * *

UNITED STATES PATENT AND TRADEMARK OFFICE
CERTIFICATE OF CORRECTION

PATENT NO. : 4,380,832

DATED : April 19, 1983

INVENTOR(S) : Nagata et al

Page 1 of 2

It is certified that error appears in the above–identified patent and that said Letters Patent are hereby corrected as shown below:

Col. 3, line 17, change "e" to --$\underline{e}$--;

line 27, change "a, b and c" to --$\underline{a}$, $\underline{b}$ and $\underline{c}$--;

line 28, change "a" to --$\underline{a}$--;

line 30, change "b" to --$\underline{b}$--;

line 31, change "c" to --$\underline{c}$--;

line 46, change "d" to --$\underline{d}$--;

line 62, change "f" to --$\underline{f}$--;

UNITED STATES PATENT AND TRADEMARK OFFICE
CERTIFICATE OF CORRECTION

PATENT NO. : 4,380,832

DATED : April 19, 1983

INVENTOR(S) : Nagata et al

It is certified that error appears in the above-identified patent and that said Letters Patent are hereby corrected as shown below:

Col. 3, line 68, change "f" to --$\underline{f}$--.

Col. 4, line 44, change "(Volts)" to --(Volts))--;

line 47, change "d" to --$\underline{d}$--;

line 49, change "a" to --$\underline{a}$--;

line 55, change "a" to --$\underline{a}$--.

Signed and Sealed this

Thirtieth Day of August 1983

[SEAL]

Attest:

Attesting Officer

GERALD J. MOSSINGHOFF

*Commissioner of Patents and Trademarks*